United States Patent
Voigt et al.

(10) Patent No.: US 10,248,429 B2
(45) Date of Patent: Apr. 2, 2019

(54) CONFIGURATION BASED ON A BLUEPRINT

(71) Applicant: Hewlett Packard Enterprise Development LP, Houston, TX (US)

(72) Inventors: Douglas L. Voigt, Boise, ID (US); Dejan S. Milojicic, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 44 days.

(21) Appl. No.: 15/301,977

(22) PCT Filed: Apr. 25, 2014

(86) PCT No.: PCT/US2014/035532
§ 371 (c)(1),
(2) Date: Oct. 5, 2016

(87) PCT Pub. No.: WO2015/163920
PCT Pub. Date: Oct. 29, 2015

(65) Prior Publication Data
US 2017/0123812 A1    May 4, 2017

(51) Int. Cl.
*G06F 1/00* (2006.01)
*G06F 9/4401* (2018.01)
*G06F 8/61* (2018.01)

(52) U.S. Cl.
CPC .............. *G06F 9/4401* (2013.01); *G06F 8/63* (2013.01)

(58) Field of Classification Search
CPC ................... G06F 9/4401; G06F 8/63

USPC ........ 380/282; 713/100, 156, 176, 186, 158; 709/224; 726/1
See application file for complete search history.

(56) References Cited

U.S. PATENT DOCUMENTS

| | | | |
|---|---|---|---|
| 6,976,162 B1* | 12/2005 | Ellison | H04L 9/3265 713/156 |
| 7,181,017 B1* | 2/2007 | Nagel | H04L 9/0825 380/282 |
| 7,979,245 B1* | 7/2011 | Bourlatchkov | G06F 11/3409 703/2 |
| 9,075,788 B1* | 7/2015 | Roth | G06F 11/3006 |
| 2002/0049906 A1* | 4/2002 | Maruyama | G06Q 20/027 713/176 |
| 2003/0074567 A1* | 4/2003 | Charbonneau | G06F 21/565 713/186 |

(Continued)

OTHER PUBLICATIONS

IBM; "Checking Hardware Configuration and Settings"; Feb. 9, 2014; 6 pages.

(Continued)

*Primary Examiner* — Aurel Prifti
(74) *Attorney, Agent, or Firm* — Hewlett Packard Enterprise Patent Department

(57) ABSTRACT

A non-transitory storage device includes machine readable instructions that, when executed, cause a processing resource to perform various operations. One such operation, for example, is to receive a selection of a blueprint to be used for configuration purposes. Other operations may include automatically validating the selected blueprint and automatically configuring the computing device in accordance with the selected and validated blueprint. Various related apparatuses and method are provided as well.

13 Claims, 6 Drawing Sheets

(56) References Cited

U.S. PATENT DOCUMENTS

| | | |
|---|---|---|
| 2003/0105838 A1 | 6/2003 | Presley |
| 2006/0037000 A1 | 2/2006 | Speeter et al. |
| 2006/0287967 A1* | 12/2006 | Dan ................... G06Q 10/06 705/80 |
| 2008/0216147 A1* | 9/2008 | Duffy ................. G06F 21/645 726/1 |
| 2008/0270971 A1 | 10/2008 | Agrawal et al. |
| 2009/0006519 A1 | 1/2009 | Nandan et al. |
| 2010/0050169 A1* | 2/2010 | Dehaan ................... G06F 8/61 717/178 |
| 2010/0180124 A1* | 7/2010 | Morijiri ................. G06F 21/32 713/176 |
| 2010/0205431 A1* | 8/2010 | Griffin ................. G06F 21/32 713/158 |
| 2012/0240135 A1 | 9/2012 | Risbood et al. |
| 2013/0061214 A1 | 3/2013 | Jagatheesan et al. |
| 2013/0232331 A1* | 9/2013 | Farhan ............... G06F 11/3006 713/100 |
| 2015/0117631 A1* | 4/2015 | Tuchman ................. H04W 4/21 379/265.09 |
| 2015/0207703 A1* | 7/2015 | Gallagher ........... G06F 11/3006 709/224 |
| 2017/0302537 A1* | 10/2017 | Maes ................... H04L 41/145 |

OTHER PUBLICATIONS

PCT Search Report/Written Opinion ~ Application No. PCT/US2014/035532 dated Dec. 30, 2014 ~ 10 pages.

Somasekaram, P.; "Evaluation and Analysis of Hardware Sizing for a Mission Critical Enterprise Application"; Oct. 28, 2013; 54 Pages.

Technoplanet; "Infrastructure Sizing Solutions"; Nov. 5, 2013; 2 pages.

Wang et al., "Quickly finding near-optimal storage designs," Disk array designer, ACM Transactions on Computer Systems, vol. 23 Issue 4, Nov. 2005, pp. 337-374.

"HP ProLiant Integrated Lights-Out 3 v1.20 User Guide", HP Part No. 616301-003, Edition: 1, Apr. 2011, 193 pages.

"Cloud Maps Solutions" available online at <http://www8.hp.com/us/en/business-solutions/solution.html?compURI=1216661>, 2013, 4 pages.

* cited by examiner

| BLUEPRINT ID | BLUEPRINT PARAMETERS | AUTHENTICATION DATA |
|---|---|---|
| 1 | APP, QOS, SCALE, RELIABILITY, POWER | |
| 2 | | |
| ... | | |
| N | | |

FIG. 4

CONFIGURATION BASED ON A BLUEPRINT

BACKGROUND

Many types of devices have a variety of different components depending on the needs of the customer. For example, customers may want to buy server computers from a given manufacturer. Any given server computer may have any number of processors, amount and type of memory, number of network ports, etc. Thus, suppliers of such devices are forced to provide a variety of configuration of such devices depending on customer's needs.

BRIEF DESCRIPTION OF THE DRAWINGS

For a detailed description of various examples, reference will now be made to the accompanying drawings in which:

FIG. 4 shows a data structure storing blueprints in accordance with various examples;

DETAILED DESCRIPTION

Figure 1:
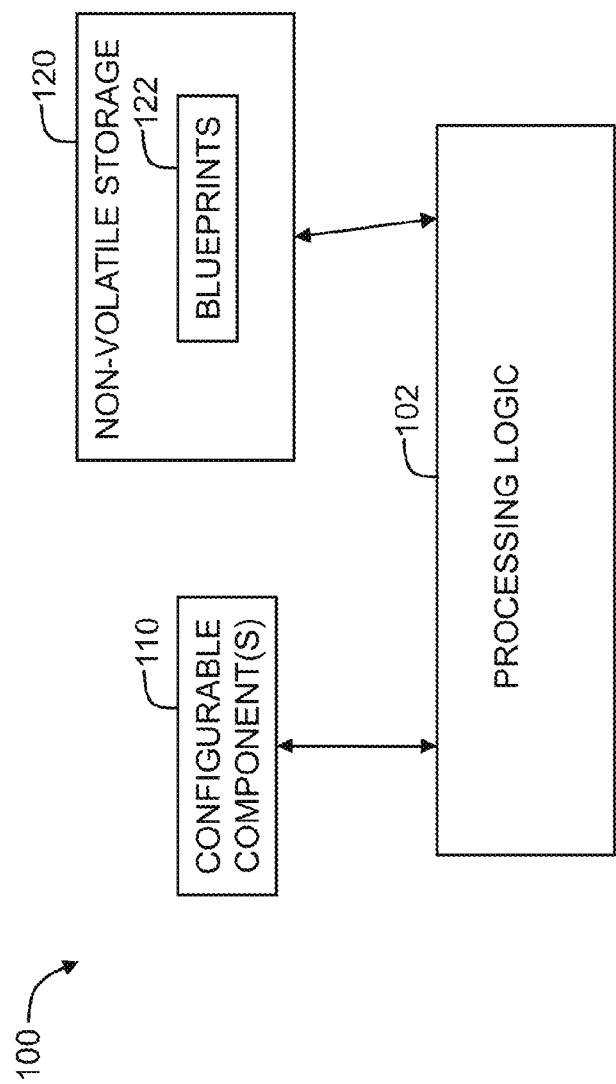
FIG. 1 shows a configurable computing device in accordance with various examples.

A configurable computing device may be used for a wide variety of applications. An example of an application includes batch processing of large amounts of data. Such applications may not be time sensitive and interruptions of the batch processing may be tolerated. Other applications may be user-interactive in that a user is directly interacting with the application and waiting for a response from the application. Such user-interactive applications are time sensitive in that a user is sitting in front of a display screen awaiting a result from the application. Some applications must be up and running at all times and down time may not be tolerated. Other applications may be tolerant of down time.

It has been determined that a computing device may be best configured a certain way for a particular application, and thus configured differently for different applications. For example, a server may be used to process a large data file and the processing may run in a background session and take 3 hours to complete. The timely completion of the job is not mission critical in that it may not matter whether the job takes 3 hours to complete, 3.5 hours, 4 hours, or even more time. Further, the job may be interrupted for whatever reason without any detrimental impact. A server that only has one or two processors may be adequate to perform this job.

On the other hand, another application may be particularly useful for real-time decision making. For example, a server may be tasked with receiving inputs from a variety of sensors and subsystems in a chemical refinery and be responsible for controlling various valves and annunciating alarms in the event of a crisis. A server performing that type of task needs to be operational at all times and must be able to respond virtually instantaneously. A server that has 16 processors and multiple network interfaces for rapid processing and redundancy may be preferred.

It may be logistically complicated and expensive for a manufacturer of configurable devices such as servers to maintain an inventory of all possible configurations for its servers for the various needs that customers might have. Further, even if such an inventory were maintained, customers might not know which device configuration is best for the customer's needs.

Accordingly, and per the disclosed embodiments, a technique is described herein by which a configurable computing device is provided with a rich set of configurable components (e.g., numerous processors, large amount of memory, numerous network interfaces, etc.). Performance testing has previously been performed to determine a configuration for the computing device that is best suited for a given application. This configuration is referred to as a "blueprint." Thus, a plurality of blueprints is determined a priori that may best configure the computing device for various types of applications (or at least configure the computing device for a given application better than at least one other configuration). A user may then purchase one or more specific blueprints depending on the needs of the customer when purchasing the computing device, and the purchased blueprint then may be used to configure the computing device. As such, the internal components of the computing device may be the same as sold between different customers, but only a subset of such components are enabled based on the specific blueprints purchased by the various customers. For example, some or all processors of a configurable device could be enabled, some or all graphics processor units (GPUs) could be enabled, or a mix of some or all processors and GPUs could be enabled. Other devices as well may be enabled such as memory and/or interconnects.

FIG. 1 shows an example of configurable computing device 100. The configurable computing device 100 may be a computer (e.g., a server, a desktop computer, etc.), a storage device, a network switch or router, or any other type of computing device that contains configurable components. No restriction is placed on the functions performed by the computing device 100. As shown, the configurable computing device 100 includes processing logic 102 coupled to configurable components 110 and non-volatile storage 120.

Figure 2:
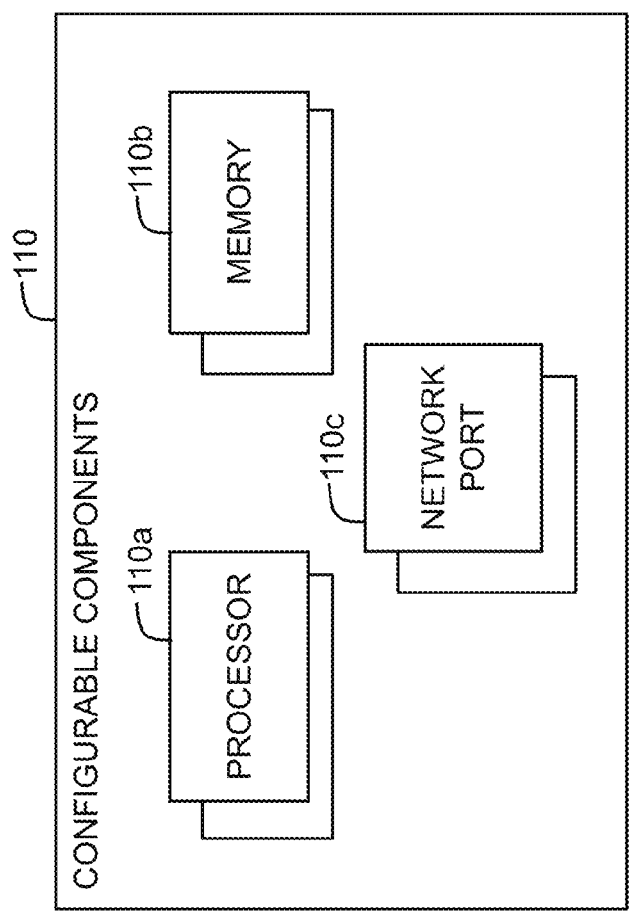
FIG. 2 shows examples of various configurable components in accordance with the disclosed principles.

The configurable components include any type of hardware and/or software components. FIG. 2 illustrates an example of configurable components 110 as including one or more processors 110a, one or more memory devices 110b, and one or more network ports 110c. Additional and/or different configurable components may be provided as well. In some examples, a given configurable component may itself be susceptible to being configured in a variety of ways. For example, a processor 110a may be configured for operating at any of a variety of clock frequencies. A network port 110c also may be configured for a desired network transmission frequency. Some configurable components may be enabled or disabled. For example, a subset of the memory devices 110b may be disabled while the remaining memory devices are enabled thereby configuring the computing device for a particular memory size (e.g., number of mega or gigabytes of memory). The number of active processors 110a in the computing device 100 also may be configured. Further still, the computing device 100 may be configured in terms of the type of active processors or the type of active memory devices. For example, the computing device may have multiple processors of different types and the processors of a particular type may be enabled while all other processors remain disabled. Similarly, the type of memory devices to be enabled may be configurable to the extent memory of different types are present in the device 100.

Referring back to FIG. 1, the non-volatile storage 120 includes one or more blueprints. A user may select one of the blueprints 122 for use in configuring the configurable computing device. Each blueprint 122 causes the processing logic 102 to configure the configurable components 110 in accordance with the selected blueprint. Generally, each blueprint 122 causes the configurable computing device 100 to be configured to best perform a particular application while also reducing or minimizing power consumption of the computing device. For example, power may be removed from any or all configurable components that are not needed for the particular blueprint that has been selected. By way of an additional example, it may be adequate to have only one processor active for a given application and while the application might run even faster if all processors were activated, the blueprint may cause only one processor to be active with all remaining processors inactive for power savings reasons.

As explained above, each blueprint is determined a priori based on performance testing. For example, for a particular application, the computing device 100 is configured multiple times in accordance with multiple different configurations. For each such configuration, various performance metrics (e.g., processor utilization, elapsed time to perform a particular task, etc.) may be measured for the device. The configuration resulting in the best performance is chosen as the blueprint for that particular application. The selection of the configuration as the blueprint may also take into account power consumption, for example, the configuration that meets the application's performance needs while consuming the least amount of power may be selected as the blueprint.

Figure 3:
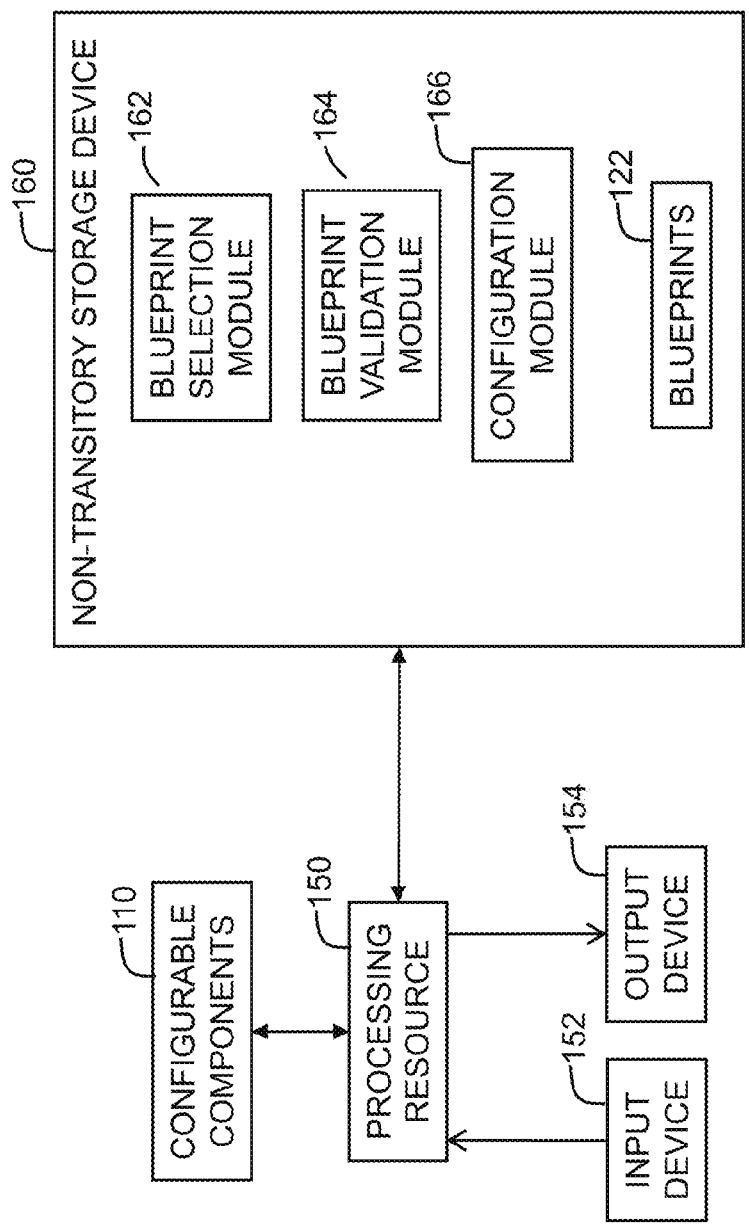
FIG. 3 shows another example of a configurable computing device in accordance with the disclosed principles.

FIG. 3 shows another example of a configurable computing device. As shown, the computing device includes a processing resource 150 coupled to an input device 152 (e.g., keyboard, mouse, track pad, etc.) and an output device 154 (e.g., display). The processing resource 150 may be a single processor, multiple processors, a computer, multiple computers, or any other type of processing resource. The processing resource 150 is coupled to a non-transitory storage device 160 that may be implemented as volatile storage (e.g., random access memory), non-volatile storage (e.g., hard disk drive, optical disc, flash storage, etc.), or combinations thereof.

The non-transitory storage device 160 includes machine readable instructions, which include a blueprint selection module 162, a blueprint validation module 164, and a configuration module 166. The modules 162-166 are executable by processing resource 150. The processing logic 102 of FIG. 1 is hardware and may be implemented, for example, as the processing resource 150 of FIG. 3 executing the machine readable instructions (e.g., modules 162-166). The processing resource 150 executing the various modules 162-166 implements some, or all, of the functionality described herein. The non-transitory storage device 160 may also include blueprints 122 with the caveat that the blueprints 122 are generally stored in non-volatile storage.

FIG. 4 shows an example of blueprints 122. The blueprints 122 may be stored in the non-volatile storage in the form a data structure such as a table. The table may include, for each blueprint, a blueprint identifier (ID), one or more blueprint parameters, and authentication data. The ID may be a number, a descriptive label or another suitable identifier to uniquely identify the blueprint. The blueprint parameters may include a plurality of parameters including at least one of the following:

An application parameter
A quality-of-service (QoS) parameter
A scale parameter
A reliability parameter.
A power parameter.

The application parameter indicates a type of application for which the blueprint is suited. Examples of application parameters include general classes of applications, such as batch processing, interactive processing, and transaction processing: or specific applications, such as Hadoop, Vertica, Storm, etc. The QoS parameter indicates a desired QoS level. The QoS level may be specified in a variety of ways such as on a scale of low-medium-high, on a scale of 1 to 5, etc. The scale parameter indicates the size of a multi-node system and may be specified as the number of nodes. The reliability parameter indicates a desired reliability level and may be specified as high or low, or on a range (e.g., low-medium-high, 1 to 5, etc., or a number of "9s," indicating percentage that the system needs to be "up," e.g., 99.9% for 3 9s). Different or other blueprint parameters are possible as well. The power parameter includes a maximum permitted power draw for the computing device. This maximum permitted power draw may be less than the power rating for the computing device. For example, the computing device may have a 500 W power supply, but the power parameter may specify a maximum power draw of 200 W. The power parameter may specify the maximum power draw value in terms of a number of watts, a percentage of the maximum rating for the computing device, or any other type of value.

The authentication data for each blueprint may include data that is usable to verify the authenticity of the blueprint and may include such data as a digital signature (explained below).

Figure 5:
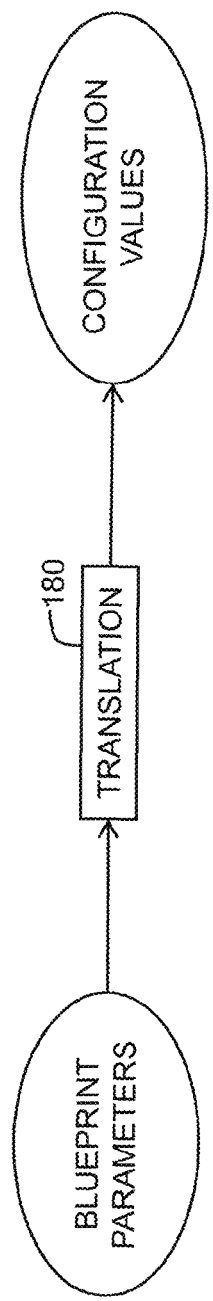
FIG. 5 illustrates a translation of blueprint parameters to configuration values in accordance with various examples.

FIG. 5 shows that blueprint parameters from a selected blueprint (selection process described below) may be translated to one or more configuration values. The configuration values dictate how the configurable components of the configurable computing device 100 are to be configured in accordance with the given blueprint. The configuration values may include at least one of: a number of processors, processor type, frequency, memory size, memory type, and interconnect type (e.g., network port type). For example, if the number of processors for a configuration value is "2," then two of the processors 110a are enabled while all other processors 110a are disabled and remain disabled.

Translation logic 180 may perform the translation between blueprint parameters and configuration values. The translation logic 180 may be implemented by the processing resource 150 executing the configuration module 166. The translation from blueprint parameters to configuration values may be performed in any of a variety of ways. For example, translation logic 180 may implement a direct mapping from blueprint parameters to configuration values. For example, a data structure (e.g., the table of FIG. 4 or a separate data structure) can include a mapping from blueprint parameters to configuration parameters in n-dimensional space.

The translation logic 180 may implement mapping functions which linearly map from a single configuration parameter proportionally to scale blueprint parameters.

Further still, the translation logic 180 may implement more sophisticated design space search algorithms by calculating configuration parameters as a specific function of the blueprint parameters.

As explained above, the blueprint parameters may include a power parameter, which indicates the maximum permitted power draw for the computing device. The translation of blueprint parameters to configuration values takes the power parameter into account. For example, the translation process may determine suitable configuration values for the application, QoS, scale, and reliability blueprint values while also causing the computing device to consume power at a rate that is less than or equal to the level indicated by the power parameter. All else being equal, different power parameters may result in different configurations of the computing device. Consequently, blueprints may be provided that are suitable for different power levels.

A customer may desire to purchase one or more configurable computing devices 100. The customer may indicate to the supplier of the computing devices the application(s) the customer intends to execute on the computing devices. The supplier has previously performed performance testing on the computing device for each possible application to determine a suitable configuration (blueprint) for the computing device for that application. The customer may choose (and possibly pay for) one or more blueprints that are best suited to the application the customer intends to execute on the computing devices. The selection of blueprints by the customer may occur on-line via a graphical user interface or by way of a person-to-person conversation (e.g., telephone call). The supplier then may supply the computing devices to the customer with all blueprints, but only those blueprints that the customer has specifically chosen are made available to the customer. This can be accomplished, by e.g., providing a password or a key that may enable decryption of only one specific blueprint.

In some implementations, each blueprint previously chosen by a customer is digitally protected against improper use. For example, each blueprint may be digitally signed for subsequent authentication purposes. A digital signature may be computed, for example, by computing a hash of the data structure containing the blueprint along with one or more values unique to the configurable computing device (e.g., serial number). The blueprint also may be encrypted. Once the signature is computed for each blueprint, each such blueprint (possibly encrypted) along with the signature for that blueprint is stored on the configurable computing device and provided to the customer.

Figure 6:
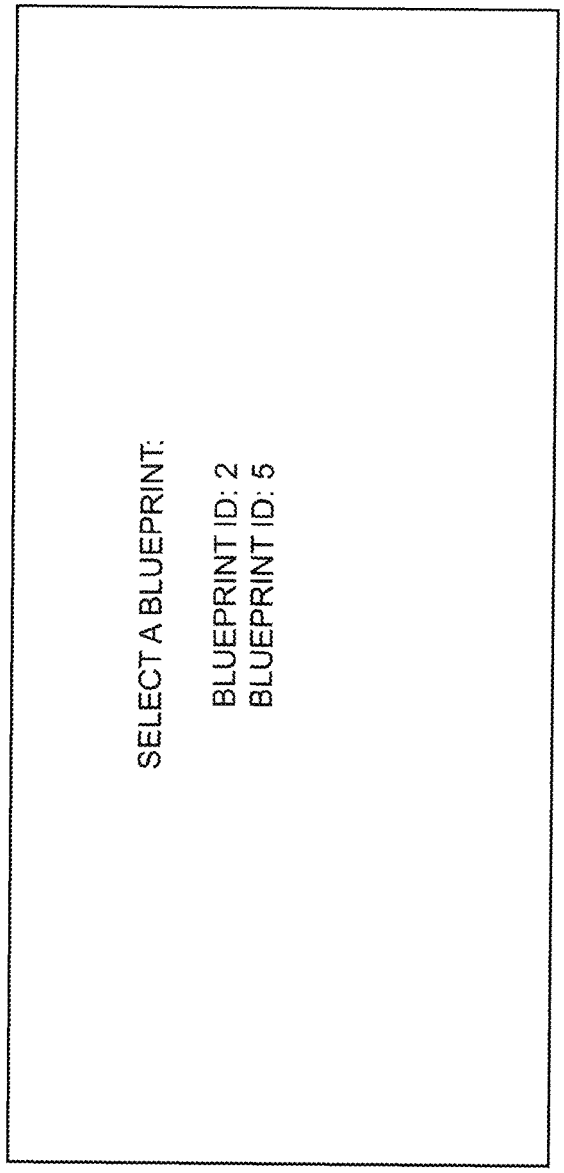
FIG. 6 illustrates a user interface for selection of a blueprint in accordance with various examples.

Once the customer causes the configurable computing device 100 to begin an initialization process, a user interface (e.g., a graphical user interface) is displayed on output device 154. An example of such a user interface is shown in FIG. 6 which illustrates that the user is to select one of two possible blueprints having blueprint IDs 2 and 5 (or other descriptive designation for the blueprints). The blueprints shown on the user interface are those blueprints that the user previously chose for inclusion in the configurable computing device from the supplier. Other blueprints may be stored on the computing device, but because those blueprints were not chosen by the customer during the sales transaction and thus are not authorized for the computing device, those blueprints are hidden from access by the customer and are not made available for selection during initialization on the user interface. Thus, in some implementations, at least one blueprint stored in non-volatile storage 120 (or storage device 160) is not accessible for use in configuring the configurable components 110. The processing logic 102 e.g., the processing resource 150 executing the blueprint selection module 162) may cause the user interface to be displayed and receive the user's blueprint selection choice.

The user in the example of FIG. 6 selects either blueprint ID 2 or blueprint ID 5 presumably depending on the particular application that the customer intends to run on that particular computing device 100. By way of an example, a customer may purchase 1000 servers and may intend to use 600 of the servers to run one application and the remaining 400 servers to run a different application. The customer may purchase the blueprint best suited for each application, and thus purchase two blueprints for each computing device. By purchasing both blueprints for each computing device, the customer can decide at later time (e.g., upon device installation) which blueprint should be used to configure each such computing device.

Figure 7:
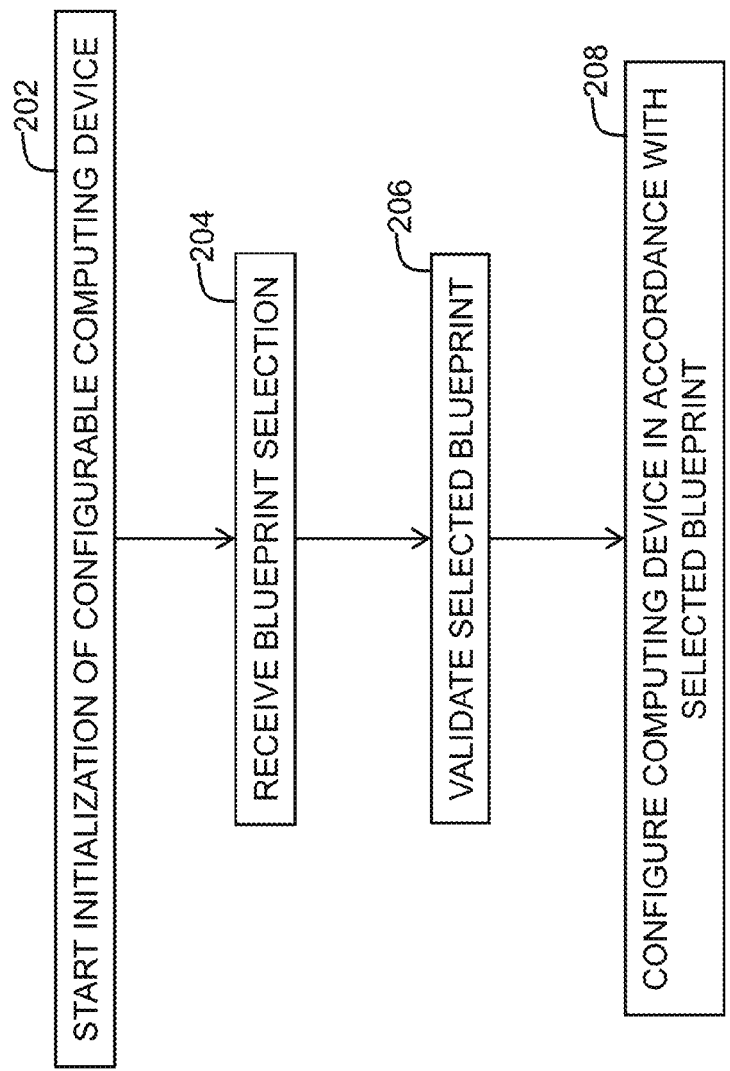
FIG. 7 shows a method in accordance with various examples.

FIG. 7 illustrates a method in accordance with various implementations. The operations depicted may be performed in the order shown, or in a different order. At 202, the method includes starting initialization of a configurable computing device (e.g., device 100). During or after the initialization process, a user selects a blueprint to be used to configure the computing device. The blueprint selection process may be implemented by the processing resource 150 (FIG. 3) executing the blueprint selection module 162 to cause a user interface to be displayed on output device 154. A user selects one of the displayed blueprints and the method includes (at 204) receiving a selection of the user-desired blueprint to be used to configure the configurable computing device.

At 206, the method further includes automatically validating the selected blueprint. "Automatically" means that human interaction is not required to actually perform the validation—the blueprint validation process is triggered upon the user selecting the blueprint. The validation process of operation 206 may include the processing resource 150 executing the blueprint validation module 164. The validation process may include any of: validating the selected blueprint, decrypting the selected blueprint, recomputing the hash of the selected blueprint, and comparing the newly recomputed hash with the hash of the blueprint computed by the supplier (i.e., authenticating a hash value of the blueprint). The validation process also may include determining whether the configurable components can be configured as defined by the selected blueprint. For example, as the hardware configurations evolve over the time, e.g., by upgrades, extensions, and such, some of the blueprints may not be valid for new hardware configurations and may have to be upgraded as well.

At 208, the method further includes automatically configuring the configurable computing device in accordance with the selected and validated blueprint. For example, the processing resource 150 executing the configuration module 166 may translate the blueprint parameters of the validated blueprint to configuration values as explained above, and then use the configuration values to actually configure the configurable components 110 of the computing device.

The above discussion is meant to be illustrative of various examples. Numerous variations and modifications will become apparent to those skilled in the art once the above disclosure is fully appreciated. It is intended that the following claims be interpreted to embrace all such variations and modifications.

What is claimed is:

1. A configurable computing device, comprising:
a plurality of configurable components;
non-volatile storage including a plurality of blueprints, each blueprint defining a particular configuration for the configurable components; and
processing logic coupled to the non-volatile storage and to:
receive a selection of one of the blueprints from the non-volatile storage;
validate the selected blueprint by validating a digital signature of the selected blueprint, authenticating a hash value associated with the selected blueprint, and determining whether the plurality of configurable components can be configured as defined by the selected blueprint; and
configure the configurable components in accordance with the selected and validated blueprint.

2. The computing device of claim 1 wherein at least one of the blueprints on the non-volatile storage is not accessible for use in configuring the configurable components.

3. The computing device of claim 1 wherein the processing logic implements a user interface by which a user selects the blueprint.

4. The computing device of claim 3 wherein the user interface displays and permits selection of only that blueprint or those blueprints from among the plurality of blueprints on the non-volatile storage that has or have been authorized for the configurable computing device.

5. The computing device of claim 1 wherein each blueprint includes a plurality of parameters including at least one of:
an application parameter;
a quality of service parameter;
a scale parameter;
a reliability parameter; and
a power parameter.

6. The computing device of claim 1 further comprising translation logic that translates the selected and validated blueprint to a set of configuration values for configuration of the configurable components.

7. The computing device of claim 6 wherein the set of configuration values includes at least one of: a number of processors, processor type, frequency, memory size, memory type, and interconnect type.

8. The computing device of claim 1 wherein the processing logic causes power to be removed from all of the plurality of configurable components not needed for the selected blueprint.

9. A non-transitory storage device containing machine readable instructions that, when executed, cause a processing resource to:
receive a selection of a blueprint to be used to configure a configurable computing device;
automatically validate the selected blueprint by validating a digital signature of the selected blueprint, authenticating a hash value associated with the selected blueprint, and determining whether the configurable computing device can be configured as defined by the selected blueprint; and
automatically configure the computing device in accordance with the selected and validated blueprint.

10. The non-transitory storage device of claim 9 wherein the selected blueprint includes a plurality of parameters including at least one of:
an application parameter;
a quality of service parameter;
a scale parameter;
a reliability parameter; and
a power parameter.

11. The computing device of claim 9 wherein the machine readable instructions are to cause the processing resource to translate the selected and validated blueprint to a set of configuration values for configuration of the configurable computing device, wherein the set of configuration values includes at least one of: a number of processors, processor type, frequency, memory size, memory type, and interconnect type.

12. A method, comprising:
starting initialization of a configurable computing device;
receiving a selection of a blueprint to be used to configure the configurable computing device;
automatically validating the selected blueprint by validating a digital signature of the selected blueprint, authenticating a hash value associated with the selected blueprint, and determining whether the configurable computing device can be configured as defined by the selected blueprint; and
automatically configuring the configurable computing device in accordance with the selected and validated blueprint.

13. The method of claim 12 wherein the configurable computing device stores a plurality of blueprints and the method further comprises displaying a list of some, but not all, of the blueprints thereby limiting which blueprints are selectable.

* * * * *